US011808216B1

(12) United States Patent
Johnson et al.

(10) Patent No.: US 11,808,216 B1
(45) Date of Patent: Nov. 7, 2023

(54) AIR-PROVISIONING SYSTEM WITH EJECTORS

(71) Applicants: Rolls-Royce North American Technologies Inc., Indianapolis, IN (US); Rolls-Royce Corporation, Indianapolis, IN (US); Rolls-Royce plc, London (GB)

(72) Inventors: Paul K. Johnson, Ft. Wayne, IN (US); Andrew J. Eifert, Indianapolis, IN (US); Richard Peace, London (GB); Richard Young, London (GB); Robert T. Duge, Indianapolis, IN (US)

(73) Assignees: Rolls-Royce North American Technologies Inc., Indianapolis, IN (US); Rolls-Royce Corporation, Indianapolis, IN (US); Rolls-Royce plc

( * ) Notice: Subject to any disclaimer, the term of this patent is extended or adjusted under 35 U.S.C. 154(b) by 0 days.

(21) Appl. No.: 17/837,749

(22) Filed: Jun. 10, 2022

(51) Int. Cl.
*F02C 9/18* (2006.01)
*F02C 6/08* (2006.01)

(52) U.S. Cl.
CPC ............... *F02C 9/18* (2013.01); *F02C 6/08* (2013.01); *F05D 2220/323* (2013.01); *F05D 2260/605* (2013.01); *F05D 2260/606* (2013.01); *F05D 2270/3061* (2013.01)

(58) Field of Classification Search
CPC . B64C 29/00; B64C 29/0008; B64C 29/0016; B64C 29/0025; B64C 29/0033; B64C 29/0041; B64C 29/005; B64C 29/0075; B64C 29/02; B64C 29/04; F02C 6/08; F02C 9/08; F02C 9/18; F05D 2220/329; F05D 2220/323; F05D 2260/605; F05D 2260/606; F05D 2270/3061; F02K 7/005; F01D 1/32
See application file for complete search history.

(56) References Cited

U.S. PATENT DOCUMENTS

| | | | |
|---|---|---|---|
| 4,222,233 A | 9/1980 | Johnson et al. | |
| 4,844,689 A | 7/1989 | Seed | |
| 6,834,495 B2 | 12/2004 | Saito et al. | |
| 8,636,241 B2 | 1/2014 | Lugg et al. | |
| 9,297,304 B2 | 3/2016 | Nordstrom et al. | |
| 9,950,788 B2 | 4/2018 | Garcia et al. | |
| 10,710,713 B2 | 7/2020 | Mia | |
| 10,934,011 B2 | 3/2021 | Evulet | |
| 11,078,841 B2 * | 8/2021 | Mackin | F02C 6/08 |
| 11,549,434 B2 * | 1/2023 | Zysman | F02C 7/18 |
| 11,573,130 B2 * | 2/2023 | McBrien | G01K 3/14 |

(Continued)

FOREIGN PATENT DOCUMENTS

KR 102103794 B1 5/2020

*Primary Examiner* — Todd E Manahan
*Assistant Examiner* — Rodolphe Andre Chabreyrie
(74) *Attorney, Agent, or Firm* — Barnes & Thornburg LLP

(57) ABSTRACT

A propulsion system includes two gas turbine engines and an air-provisioning system. The air-provisioning system includes a first ejector, a second ejector, a plenum fluidically connected with the first ejector and the second ejector, and a first propulsor. The air-provisioning system is configured to bleed and mix air from each gas turbine engine in the ejectors so as to provide selectively a flow of plenum air from the plenum to the first propulsor at a desired pressure and a desired flow rate to power the first propulsor.

20 Claims, 3 Drawing Sheets

(56) References Cited

U.S. PATENT DOCUMENTS

| | | | | |
|---|---|---|---|---|
| 11,591,967 | B2* | 2/2023 | Foutch | F02C 7/32 |
| 2012/0056034 | A1* | 3/2012 | Kosheleff | B64C 29/0025 |
| | | | | 244/58 |
| 2019/0309683 | A1* | 10/2019 | Mackin | B64D 15/04 |
| 2019/0383220 | A1* | 12/2019 | Mackin | F02C 9/18 |
| 2020/0063660 | A1* | 2/2020 | Mackin | F02K 3/115 |
| 2021/0094685 | A1 | 4/2021 | Klemen | |
| 2022/0381181 | A1* | 12/2022 | Briley | F04F 5/463 |

* cited by examiner

AIR-PROVISIONING SYSTEM WITH EJECTORS

FIELD OF THE DISCLOSURE

The present disclosure relates generally to propulsion systems, in particular propulsion systems including gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted by rows of rotating blades and non-rotating vanes to drive the compressor and, sometimes, an output shaft.

Gas turbine engines may also be utilized in conjunction with other types of engines, such as rotors, for providing power for rotorcraft such as helicopters and gyrocopters. In some applications, a propulsion system may include a gas turbine engine that at least partially contributes to powering a rotor of a helicopter or gyrocopter.

SUMMARY

The present disclosure may comprise one or more of the following features and combinations thereof.

A propulsion system according to the present disclosure includes a first gas turbine engine, a second gas turbine engine, and an air-provisioning system. The first gas turbine engine includes a first propulsive fan, a first engine core including a first compressor, a first combustor, and a first turbine configured to drive the first propulsive fan, and a first bypass duct surrounding the first engine core. The second gas turbine engine including a second propulsive fan, a second engine core including a second compressor, a second combustor, and a second turbine configured to drive the second propulsive fan, and a second bypass duct surrounding the second engine core. The air-provisioning system includes a first ejector, a second ejector, a plenum that is fluidically connected with the first ejector and the second ejector, and a first propulsor, the air-provisioning system configured to bleed and mix air from the first gas turbine engine and the second gas turbine engine to provide selectively a flow of plenum air from the plenum to the first propulsor at a desired pressure and a desired flow rate to power the first propulsor.

In some embodiments, the first ejector is fluidically connected to the first compressor and the first bypass duct of the first gas turbine engine such that first compressor bleed air from the first compressor and first bypass bleed air from the first bypass duct is conducted to the first ejector and the first ejector outputs a first mixed bleed air to the plenum having a pressure that is higher than a pressure of the first bypass bleed air. The second ejector is fluidically connected to the second compressor and the second bypass duct of the second gas turbine engine such that second compressor bleed air from the second compressor and second bypass bleed air from the second bypass duct is conducted to the second ejector and the second ejector outputs a second mixed bleed air to the plenum having a pressure higher than a pressure of the second bypass bleed air. The first mixed bleed air and the second mixed bleed air are combined in the plenum to provide the plenum air having the desired pressure and the desired flow rate, and the plenum is configured to conduct selectively the flow of plenum air to the first propulsor at the desired flow rate and the desired pressure to drive rotation of the first propulsor.

In some embodiments, the propulsion system further includes a first compressor bleed valve configured to control the first compressor bleed air bled from the first compressor to the first ejector, a second compressor bleed valve configured to control the second compressor bleed air bled from the second compressor to the second ejector, a first bypass bleed valve configured to control the first bypass bleed air bled from the first bypass duct to the first ejector, and a second bypass bleed valve configured to control the second bypass bleed air bled from the second bypass duct to the second ejector. The system further includes a controller configured to, based on a first operating condition of the first gas turbine engine and a second operating condition of the second gas turbine engine, control the first and second compressor bleed valves and the first and second bypass bleed valves so as to control the first and second compressor bleed air and the first and second bypass bleed air to the first and second ejectors such that the first and second mixed bleed air are combined in the plenum to form the plenum air and such that the plenum air that is output from the plenum to the first propulsor is at the desired pressure and the desired flow rate.

In some embodiments, the controller is configured to control the first and second compressor bleed valves and the first and second bypass bleed valves such that a first compressor flow rate and a second compressor flow rate of the first and second compressor bleed airs, respectively, are less than a first bypass flow rate and a second bypass flow rate of the first and second bypass bleed airs, respectively.

In some embodiments, a first mixed bleed flow rate and a first mixed bleed pressure of the first mixed bleed air are equal to a second mixed bleed flow rate and a second mixed bleed pressure of the second mixed bleed air.

In some embodiments, the desired flow rate and the desired pressure of the flow of plenum air output from the plenum to the first propulsor is 25 lbm/s and 25 psia, respectively.

In some embodiments, the first bypass flow rate and the second bypass flow rate are in a range of 8.5 lbm/s to 12.15 lbm/s, and the first compressor flow rate and the second compressor flow rate are in a range of 0.35 lbm/s to 4 lbm/s.

In some embodiments, a first sum of the first bypass flow rate and the first compressor flow rate is equal to 12.5 lbm/s, and a second sum of the second bypass flow rate and the second compressor flow rate is equal to 12.5 lbm/s.

In some embodiments, the first and second operating conditions are a 50% power level of the first and second gas turbine engines, the first and second bypass flow rates are equal to 9.5 lbm/s, and the first and second compressor flow rates are equal to 3 lbm/s.

In some embodiments, the first and second operating conditions are a 100% power level of the first and second gas turbine engines, the first and second bypass flow rates are equal to 12.15 lbm/s, and the first and second compressor flow rates are equal to 0.35 lbm/s.

In some embodiments, the first compressor includes a first compressor discharge section and a first inter-stage compressor section, the second compressor includes a second compressor discharge section and a second inter-stage compressor section, and, in response to the first and second operating conditions being a power level of the first and second gas turbine engines being greater than 50%, the first and second compressor bleed airs are bled entirely from the first and second compressor discharge sections, respectively.

In some embodiments, in response to the first and second operating conditions being a power level of the first and second gas turbine engines being equal to or less than 40%, the first and second compressor bleed airs are bled partially from the first and second compressor discharge sections, respectively, and partially from the first and second inter-stage compressor sections, respectively.

In some embodiments, the first and second operating conditions are a 40% power level of the first and second gas turbine engines, the first and second bypass flow rates are equal to 8.3 lbm/s, the first and second compressor flow rates are equal to 4.2 lbm/s, a portion of the first and second compressor flow rates bled from the first and second compressor discharge sections, respectively, is equal to 2.1 lbm/s, and a portion of the first and second compressor flow rates bled from the first and second inter-stage compressor sections, respectively, is equal to 2.1 lbm/s.

In some embodiments, the first ejector is a variable geometry ejector including at least one variable geometric feature configured to vary a flow path of at least one of the first compressor bleed air and the first bypass bleed air such that the first mixed bleed air is output at a first desired ejector output flow rate and a first desired ejector output pressure. The second ejector is a variable geometry ejector including at least one variable geometric feature configured to vary a flow path of at least one of the second compressor bleed air and the second bypass bleed air such that the second mixed bleed air is output at a second desired ejector output flow rate and a second desired ejector output pressure.

A propulsion system according to a further aspect of the present disclosure includes a first gas turbine engine, a second gas turbine engine, and an air-provisioning system. The first gas turbine engine includes a first engine core that has a first compressor and a first bypass duct surrounding the first engine core. The second gas turbine engine includes a second engine core that has a second compressor and a second bypass duct surrounding the second engine core. The air-provisioning system includes a first ejector fluidly connected with the first compressor and the first bypass duct, a second ejector fluidly connected with the second compressor and the second bypass duct, and a plenum fluidically connected with an outlet of the first ejector and an outlet of the second eject. The first mixed bleed air from the first ejector and second mixed bleed air from the second ejector is combined in the plenum to provide plenum air that is selectively output from the plenum at a desired flow rate and a desired pressure.

In some embodiments, first compressor bleed air from the first compressor and first bypass bleed air from the first bypass duct is conducted to the first ejector and the first ejector outputs the first mixed bleed air to the plenum having a pressure that is higher than a pressure of the first bypass bleed air. Second compressor bleed air from the second compressor and second bypass bleed air from the second bypass duct is conducted to the second ejector and the second ejector outputs a second mixed bleed air to the plenum having a pressure higher than a pressure of the second bypass bleed air. The plenum air is output to a first propulsor separate from the first and second gas turbine engine to drive rotation of the first propulsor.

In some embodiments, a first mixed bleed flow rate and a first mixed bleed pressure of the first mixed bleed air are equal to a second mixed bleed flow rate and a second mixed bleed pressure of the second mixed bleed air.

In some embodiments, the desired flow rate and the desired pressure of the flow of plenum air output from the plenum to the first propulsor is 25 lbm/s and 25 psia, respectively.

In some embodiments, a first bypass flow rate and a second bypass flow rate are in a range of 8.3 lbm/s to 12.15 lbm/s, and a first compressor flow rate and a second compressor flow rate are in a range of 0.35 lbm/s to 4.2 lbm/s.

In some embodiments, the first compressor includes a first compressor discharge section and a first inter-stage compressor section, the second compressor includes a second compressor discharge section and a second inter-stage compressor section, and, in response to the first and second operating conditions being a power level of the first and second gas turbine engines being greater than 40%, the first and second compressor bleed airs are bled entirely from the first and second compressor discharge sections, respectively.

A method includes providing a first gas turbine engine including a first propulsive fan, a first engine core including a first compressor, a first combustor, and a first turbine configured to drive the first propulsive fan, and a first bypass duct surrounding the first engine core, and providing a second gas turbine engine including a second propulsive fan, a second engine core including a second compressor, a second combustor, and a second turbine configured to drive the second propulsive fan, and a second bypass duct surrounding the second engine core. The method further includes bleeding first compressor bleed air from the first compressor and first bypass bleed air from the first bypass duct to a first ejector of an air-provisioning system, and bleeding second compressor bleed air from the second compressor and second bypass bleed air from the second bypass duct to a second ejector of the air-provisioning system.

In some embodiments, the method further includes mixing the first compressor bleed air and the first bypass bleed air in the first ejector and outputting a first mixed bleed air from the first ejector to a plenum of the air-provisioning system, mixing the second compressor bleed air and the second bypass bleed air in the second ejector and outputting a second mixed bleed air from the second ejector to the plenum, mixing the first mixed bleed air and the second mixed bleed air in the plenum to create plenum air having a desired pressure and a desired flow rate, and outputting the plenum the plenum air to a first propulsor of the air-provisioning system at the desired flow rate and the desired pressure to drive rotation of the first propulsor.

These and other features of the present disclosure will become more apparent from the following description of the illustrative embodiments.

DETAILED DESCRIPTION OF THE DRAWINGS

Figure 1:
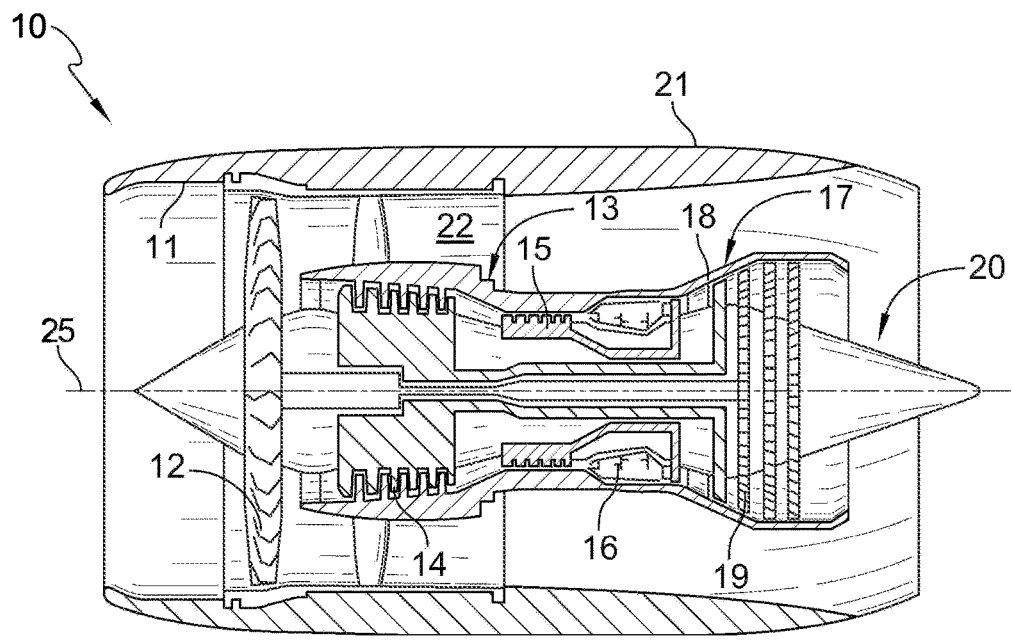
FIG. 1 is a cutaway view of a gas turbine engine to be utilized in the propulsion system according to the present disclosure, showing that the gas turbine engine includes a propulsive fan, an engine core including a compressor, a combustor, and a turbine configured to drive the first propulsive fan, and a bypass duct surrounding the engine core.

For the purposes of promoting an understanding of the principles of the disclosure, reference will now be made to a number of illustrative embodiments illustrated in the drawings and specific language will be used to describe the same.

Figure 2:
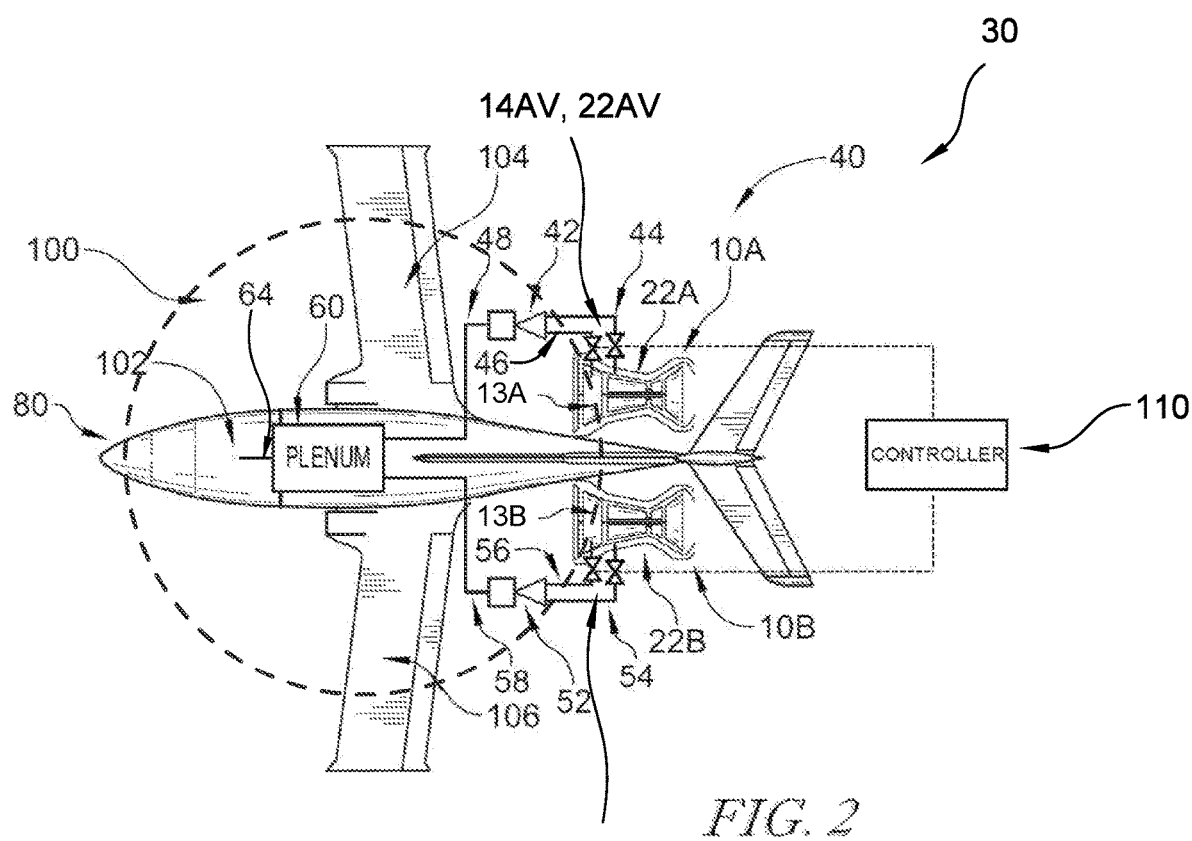
FIG. 2 is a schematic view of the propulsion system according to the present disclosure utilizing two of the gas turbine engines of FIG. 1, showing that the system includes the two gas turbine engines and an air-provisioning system including a first ejector, a second ejector, a plenum that is fluidically connected with the first ejector and the second ejector, and a first propulsor, and showing that the first and second ejectors are connected to the compressors and bypass ducts of the gas turbine engines and output mixed bleed air from the compressors and bypass ducts to the plenum such that the two mixed bleed airs are combined in the plenum and output to the first propulsor to drive the first propulsor.
Figure 3:
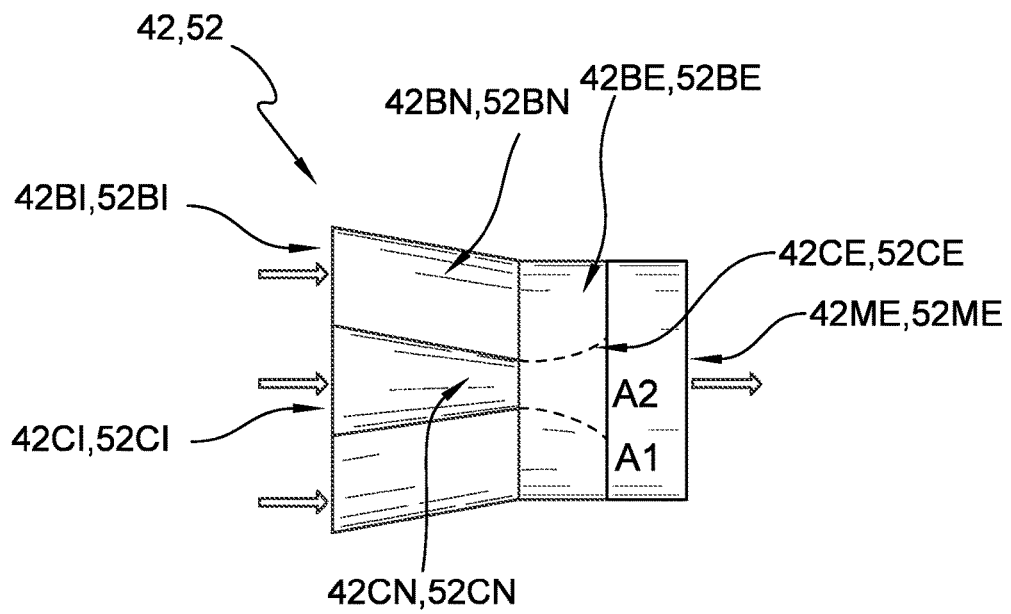
FIG. 3 is a cross-sectional view of one of the ejectors of the air-provisioning system of FIG. 2, showing that the bleed air from the compressor and bleed air from the bypass duct enters the ejector and is output as mixed bleed air to the plenum.

A propulsion system 30 according to a first embodiment of the present disclosure configured to utilize two gas turbine engines 10A, 10B is shown in FIGS. 1 and 2. Further details of the propulsion system 30 are shown in FIGS. 3 and 4. A propulsion system 230 according to a second embodiment of the present disclosure is shown in FIG. 5.

In the illustrated embodiment, the propulsion system 30 is configured for use in a gyrocopter aircraft 100 configured to take-off vertically via a tip-jet rotor 80, as shown in FIG. 2. The tip-jet rotor 80 includes jet nozzles at the tips of the rotor blades that aid in spinning the rotor, especially during startup of the tip-jet rotor 80. In order to startup the tip-jet rotor 80, typically a separate motor would be required to start the rotation of the rotor 80. Unlike typical systems, the propulsion system 30 of the present disclosure is configured to utilize bleed air from two gas turbine engines 10A, 10B of the aircraft 100 to startup and power the rotor 80. The gas turbine engines 10A, 10B which may be mounted on the aircraft 100 on the fuselage 102 of the aircraft 100, on the wings 104, 106, or in another location as would be understood by a person skilled in the art, are configured to provide forward thrust for the aircraft 100, as opposed to the rotor 80, which provides vertical lift.

The propulsion system 30 includes an air-provisioning system 40 configured to send bleed air from portions of the gas turbine engines 10A, 10B to the rotor 80 so as to provide a desired flow rate and desired pressure of the bleed air to startup and power the rotor 80. As will be described in greater detail below, the air-provisioning system 40 includes two ejectors 42, 52 configured to mix bleed air from various portions of the gas turbine engines 10A, 10B respectively, and send the mixed bleed air to a plenum 60 in which the two mixed bleed airs are again mixed and then sent to the rotor 80. The rotor 80 can thus be started and operated without the need for additional components such as a startup motor, reducing cost and reducing manufacturing complexity.

As shown in FIG. 1, an exemplary gas turbine engine 10 configured to be used as the two gas turbine engines 10A, 10B of the propulsion system 30 includes an inlet 11, a fan 12, an engine core including a compressor 13 having an inter-stage compressor section 14 and a compressor discharge section 15, a combustor 16, and a turbine 17 having a high-pressure turbine 18 and a low-pressure turbine 19. The fan 12 is driven by the turbine 17 and provides thrust for forwardly propelling the aircraft 100. The compressor 13 compresses and delivers air to the combustor 16. The combustor 16 mixes fuel with the compressed air received from the compressor 13 and ignites the fuel. The hot, high-pressure products of the combustion reaction in the combustor 16 are directed into the turbine 17 to cause the turbine 17 to rotate about an axis 25 of the gas turbine engine 10 and drive the compressor 13 and the fan 12.

The gas turbine engine 10 further includes a bypass duct 22 that surrounds the engine core, in particular the compressor 13, the combustor 16, and the turbine 17, as shown in FIG. 1. A portion of the air entering the inlet 11 is directed around the engine core and through the bypass duct 22. In the illustrative embodiment, the propulsion system 30 may bleed air from at least one of the compressor 13 sections, in particular the inter-stage compressor section 14 and the compressor discharge section 15, as well as from the bypass duct 22 in order to be later utilized by the rotor 80. In typical scenarios in which bleed air is utilized for powering applications, bleed air would be taken from one or more of the compressor stages. However, certain gyrocopter applications, including the gyrocopter aircraft 100 in the exemplary embodiment, require an unusual flow rate and pressure of bleed air to perform properly.

In order to achieve the required flow rates and pressure of the bleed air from the two gas turbine engines 10A, 10B the propulsion system 30 includes an air-provisioning system 40 configured to achieve the required flow rate and pressure of the bleed air being sent to the rotor 80. In particular, as shown in FIG. 2, the air-provisioning system 40 includes a first ejector 42, a second ejector 52, a plenum 60 that is fluidically connected with the first ejector 42 and the second ejector 52, and the rotor 80, also referred to as a first propulsor.

In the illustrated embodiment, the first ejector 42 is fluidically connected to the bypass duct 22A of the first gas turbine engine 10A via a first bypass bleed air fluid line 44, and is also fluidically connected to the compressor 13A of the first gas turbine engine 10A via a first compressor bleed air fluid line 46, as shown in FIG. 2. Similarly, the second ejector 52 is fluidically connected to the bypass duct 22B of the second gas turbine engine 10B via a second bypass bleed air fluid line 54, and is also fluidically connected to the compressor 13B of the second gas turbine engine 10B via a second compressor bleed air fluid line 56.

In some embodiments, the flow of the bleed air bled from the compressors 13A, 13B and the bypass ducts 22A, 22B may each be regulated via bleed valves arranged along the fluid lines 44, 46, 54, 56. In the illustrated embodiment, the air-provisioning system 40 includes a first compressor bleed valve 14AV configured to control the first compressor bleed air bled from the first compressor 14A to the first ejector 42 and a second compressor bleed valve 14BV configured to control the second compressor bleed air bled from the second compressor 14B to the second ejector 52. The system 40 further includes a first bypass bleed valve 22AV configured to control the first bypass bleed air bled from the first bypass duct 22A to the first ejector 42, and a second bypass bleed valve 22BV configured to control the second bypass bleed air bled from the second bypass duct 22B to the second ejector 52. Each of the valves 14AV, 14BV, 22AV, 22BV may selectively regulate the bleed air exiting the respective engine component before the bleed air reaches the ejectors 42, 52. In some embodiments, as will be described below, the valves 14AV, 14BV, 22AV, 22BV may be electronically connected to a controller 110 configured to control each valve 14AV, 14BV, 22AV, 22BV.

In the illustrated embodiment, the first ejector 42 is configured to mix the incoming bleed air from the compressor 13A and the bypass duct 22A and output a first mixed bleed air to the plenum 60, as shown in FIG. 2. Similarly, the second ejector 52 is configured to mix the incoming bleed air from the compressor 13B and the bypass duct 22B and output a second mixed bleed air to the plenum 60. Each ejector 42, 52 includes a bypass bleed air inlet 42BI, 52BI that opens into an annular bypass bleed air nozzle 42BI, 52BI. The nozzle 42BI, 52BI annularly surrounds an annular compressor bleed air nozzle 42CN, 52CN having a compressor bleed air inlet 42CI, 52CI. The bypass bleed air enters the inlet 42BI, 52BI at a first pressure and temperature, and the compressor bleed air enters the inlet 42CI, 52CI at a second pressure and temperature.

In the illustrated embodiment, the compressor bleed air nozzle 42CN, 52CN converges at a steeper angle than the annular bypass bleed air nozzle 42BN, 52BN, as shown in FIG. 3. The bypass bleed air nozzle 42BN, 52BN includes a bypass bleed air exit section 42BE, 52BE axially downstream of the nozzle 42BN, 52BN, 42CN, 52CN, the outer wall of the bypass bleed air exit section 42BE, 52BE being entirely annular and not converging or diverging. The compressor bleed air nozzle 42CN, 52CN includes a compressor bleed air exit section 42CE, 52CE axially aligned with the bypass bleed air exit section 42BE, 52BE that diverges, or expands, such that the pressure of the compressor bleed air is lowered as it passes through the compressor bleed air exit section 42CE, 52CE. The ejector 42, 52 further includes a mixed bleed air exit section 42ME, 52ME axially downstream of the bypass and compressor exit sections 42BE, 52BE, 42CE, 52CE in which the bleed air of the compressor and the bypass duct are mixed and output from the ejector 42, 52 at a mixed pressure and temperature, and at a mixed flow rate.

In some embodiments, the ejectors 42, 52 may be variable geometry ejectors including at least one variable geometric feature configured to vary a flow path of at least one of the first compressor bleed air and the first bypass bleed air. In particular, the outer or inner annular walls of one or more of the bypass bleed air nozzle 42BN, 52BN, the compressor bleed air nozzle 42CN, 52CN, the bypass bleed air exit section 42BE, 52BE, the compressor bleed air exit section 42CE, 52CE, or the mixed bleed air exit section 42ME, 52ME may be geometrically variable so as to vary the flow path and thus the flow rate and pressures of the compressor and bypass bleed air flows. As such, the first and second mixed bleed air may be output from the ejectors 42, 52 at a desired ejector output flow rate and a desired ejector output pressure. In some embodiments, the ejectors 42, 52 may be electronically connected to the controller 110 configured to control each variable geometric feature.

After the compressor and bypass bleeds have been mixed within each ejector 42, 52, the first ejector 42 outputs the first mixed bleed air to the plenum 60 via a first mixed bleed fluid line 48, and the second ejector 52 outputs the second mixed bleed air to the plenum 60 via a second mixed bleed fluid line 58, as shown in FIG. 2. A person skilled in the art will understand that the plenum 60 may be any chamber, fluid line, or other similar structure in which the first mixed bleed air and the second mixed bleed air can mix together. Once the first mixed bleed air and the second mixed bleed air are mixed within the plenum 60, the mixture, also referred to as plenum air, having the desired pressure and the desired flow rate is output from the plenum 60 to the rotor 80 via a plenum output fluid line 64 at the desired flow rate and the desired pressure to startup and/or drive rotation of the rotor 80. In some embodiments, the plenum output fluid line 64 is fluidically connected to the motor of the rotor 80.

Regarding the desired pressure and the desired flow rate that is output from the plenum 60, the ejectors 42, 52 are each configured for the particular application and the desired output pressure and flow rate that is required of that application. In the illustrated embodiment, each ejector 42, 52 is designed to output a pressure and flow rate to the plenum 60 such that the mixed plenum air that is output to the rotor 80 is at a pressure and flow rate required to sufficiently power the rotor 80. In particular, in at least one embodiment, the required pressure and flow rate of the plenum air required to power the rotor 80 is 25 psia and 25 lbm/s, respectively. The desired pressure and flow rate may be achieved in various manners based on the particular operating conditions of the engines 10A, 10B and the aircraft 100.

Bleed pressures and temperatures from the compressor 13A, 13B and bypass duct 22A, 22B vary with the gas turbine engine 10A, 10B power setting. In the gas turbine engines 10A, 10B utilized herein, bypass duct pressure at all engine power settings is below 25 psia, and therefore cannot satisfy the required pressure of the rotor 80 of the present embodiment. The compressor 13A, 13B pressure, which is taken from a discharge section 15 of the respective compressor 13A, 13B in embodiments in which the engine power is at 50% or above, is well above 25 psia. However, the gas turbine engine 10A, 10B is not able to support the required flow rate of 25 lbm/s with compressor bleed alone. Moreover, the temperature of the bleed air at the compressor discharge section 15 is higher than the rotor 80 can tolerate. This is the reason that a combination of the bypass duct 22A, 22B bleed air and the compressor 13A, 13B bleed air, fed through the respective ejector 42, 52, is required in order to achieve the required flow and pressure conditions output from the plenum 60 to the rotor 80.

Figure 4A:
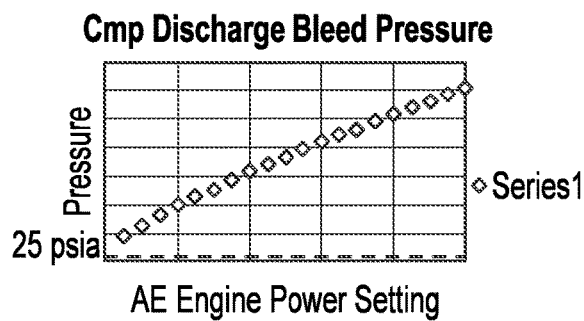
FIG. 4A is a graphical plot showing compressor discharge bleed pressure at various power settings of the gas turbine engines of FIG. 2.
Figure 4B:
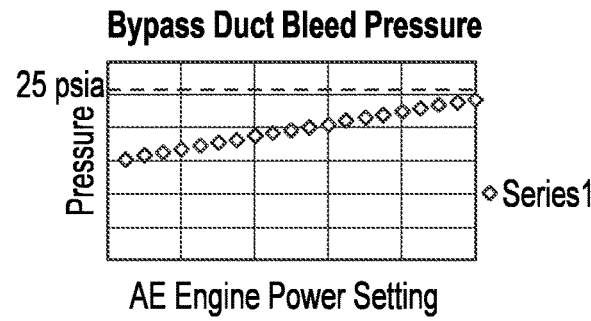
FIG. 4B is a graphical plot showing bypass duct bleed pressure at various power settings of the gas turbine engines of FIG. 2.
Figure 4C:
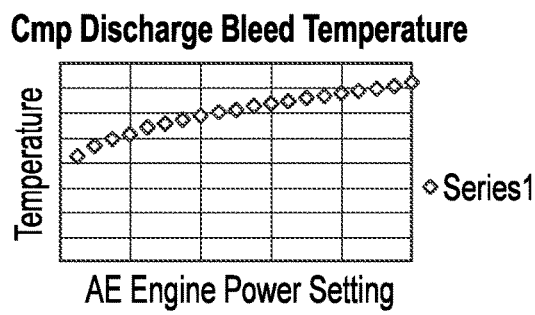
FIG. 4C is a graphical plot showing compressor discharge bleed temperature at various power settings of the gas turbine engines of FIG. 2.
Figure 4D:
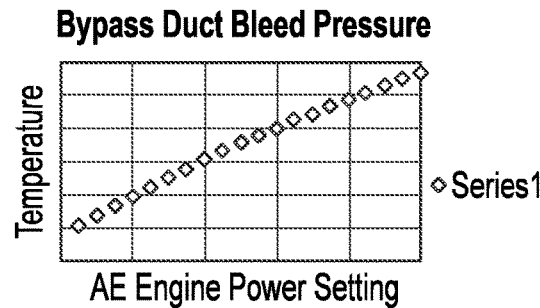
FIG. 4D is a graphical plot showing bypass duct bleed temperature at various power settings of the gas turbine engines of FIG. 2.
Figure 5:
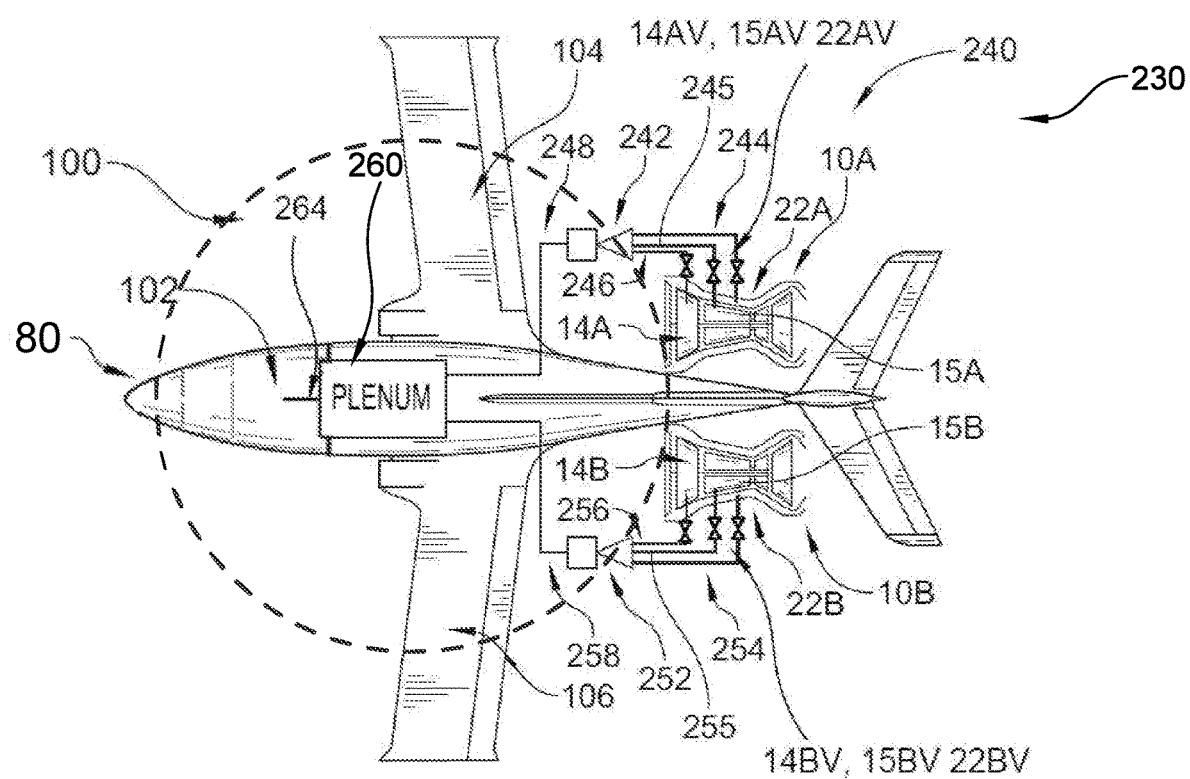
FIG. 5 is a schematic view of a propulsion system according to a further aspect of the present disclosure utilizing two of the gas turbine engines of FIG. 1, showing that the system includes the two gas turbine engines and an air-provisioning system including a first ejector, a second ejector, a plenum that is fluidically connected with the first ejector and the second ejector, and a first propulsor, and showing that the first and second ejectors are connected to compressor discharge sections as well as compressor inter-stage sections of the compressors of the gas turbine engines, and connected to bypass ducts of the gas turbine engines, and showing that the ejectors output mixed bleed air from the compressor discharge sections, the compressor inter-stage sections, and the bypass ducts to the plenum such that the two mixed bleed airs are combined in the plenum and output to the first propulsor to drive the first propulsor.

As can be seen in FIGS. 4A-4D, engine power levels can significantly impact compressor and bypass bleed air pressures and temperatures. FIG. 4A shows a graphical plot of pressure against engine power level for the compressor bleed air. As can be seen, the pressure increases as power level increases, and is consistently above the required 25 psia. FIG. 4B shows a graphical plot of pressure against engine power level for the bypass bleed air. As can be seen, the pressure slightly increases as power level increases, but is consistently below the required 25 psia. As such, the compressor bleed air pressure, when mixed in the ejectors 42, 52, will significantly boost the bypass bleed air pressure so as to achieve the required 25 psia output. FIGS. 4C and 4D show temperature against engine power level of the compressor bleed air and bypass bleed air, respectively. The temperature of the compressor and bypass bleed air flows must be taken into account as well in determining exactly how much bleed air flow from each source to direct to the ejectors 42, 52. In particular, in embodiments in which the engines 10A, 10B operate at approximately 40% power, the temperature of the compressor bleed, in particular the compressor discharge bleed, must be monitored closely to assure the temperatures do not exceed predetermined limits.

In some embodiments, an operating condition of each engine 10A, 10B may include the engine power level. In at least one embodiment, the power level of each gas turbine engine 10A, 10B may be set to be approximately 50% power. As used herein, the term "approximately" refers to a value within +/−2.5% of the indicated value. 50% engine power is nominal for this particular application, although this engine power level may vary slightly once the engine is rated for a specific application. As discussed above, at 50% engine power level and above, all of the compressor bleed may be taken from the compressor discharge section 15. In some alternative embodiments, the bleed air may be taken from a combination of inter-stage section 14 and discharge section 15. However, only taking bleed air from the compressor discharge section 15 requires less overall compressor bleed air because discharge section 15 flow is at a higher pressure than the inter-stage section 14 pressure. The higher bleed pressure at the discharge section 15 results in less flow required by the ejector 42, 52.

In such operating conditions of approximately 50% power, the system 40, in particular the controller 110, is configured to control the valves 14AV, 14BV, 22AV, 22BV so as to provide a first bypass flow rate and a second bypass flow rate that are in a range of 8.5 lbm/s to 9.5 lbm/s, and so as to provide a first compressor flow rate and a second compressor flow rate that are in a range of 3 lbm/s to 4 lbm/s. Only as much engine core bleed flow (compressor discharge section 15 in 50% level or greater scenarios, and also inter-stage section 14 bleed in less than 50% power level scenarios) as needed is utilized in order to achieve the 12.5 lbm/s and 25 psia exiting the ejector 42, 52. Only taking this minimal amount is done because, if only engine core flow was taken, the maximum allowable engine core bleed amount would be far exceeded. Moreover, even if enough bleed from the engine core could be extracted, the temperature of that bleed air would be much hotter than the rotor 80 of this particular application could tolerate. In some embodiments, the first and second compressor bleed air flows are at 3 lbm/s, respectively, and the first and bypass compressor bleed air flows are at 9.5 lbm/s, respectively. In alternative embodiments, the compressor and bypass bleed air flows could be pushed to 4 lbm/s and 8.5 lbm/s as long as the mixed temperature is not too high.

For this particular application requiring a flow rate and pressure of 25 lbm/s and 25 psia, the first bypass and compressor bleed flow rates, as well as the second bypass and compressor bleed flow rates, must each add up to 12.5 lbm/s to create the first and second mixed bleed air flows such that the combined flow rate within the plenum 60 is equal to the required 25 lbm/s. Moreover, the pressures of the bypass and compressor bleed flows must be combined in the ejectors 42, 52 such that the output mix is equal to the required 25 psia. Although the first and second mixed bleed air flows are equal in this particular application, in other embodiments, the engines 10A, 10B may provide two different mass flow rates to the plenum 60. Because the system 40 has two ejectors 42, 52, the pressures exiting the ejectors 42, 52 still must be equal to each other due to providing flow to a common plenum 60.

One particular scenario in which the utilization of bleed air to power the rotor 80 is especially valuable is during vertical take-off of the gyrocopter aircraft 100. Instead of utilizing a separate motor to start the rotor 80, the system 40 provides the bleed air at the desired flow rate and pressure of 25 lbm/s and 25 psia to start the rotor 80 and begin the take-off procedure. In order to minimize forward thrust provided by the gas turbine engines 10A, 10B during vertical or shortened take-off, the engines 10A, 10B will likely be operated at part power. The act of bleeding bypass duct air will also spoil some of the forward thrust of the engines 10A, 10B which is an added side-effect and benefit during vertical take-off operation. As such, part-power, such as 50% power, is particularly ideal for take-off scenarios.

In some conditions, additional power may be required, such as for more demanding vertical take-off scenarios. As such, at least one embodiment includes operating conditions of 100% power of the engines 10A, 10B. During 100% power level operation, the system 40, in particular—the controller 110, is configured to control the valves 14AV, 14BV, 22AV, 22BV so as to provide a first bypass flow rate and a second bypass flow rate of 12.15 lbm/s, and so as to provide a first compressor flow rate and a second compressor flow rate 0.35 lbm/s. In some embodiments, such as in emergency situations in which one engine 10A, 10B is lost, these flow rates may be achieved by a single engine 10A, 10B assuming the engine could tolerate 24.3 lbm/s of bleed extracted from the bypass duct 22A, 22B and 0.7 lbm/s of bleed extracted from the compressor. Again, during typical take-off scenarios, the engines 10A, 10B usually would not be run at 100% power so as to minimize the amount of forward thrust produced by the engines during take-off.

In operation, the air-provisioning system 40 is configured to bleed and mix the bleed air from the first gas turbine engine 10A and the second gas turbine engine 10B to provide selectively a flow of plenum air from the plenum 60 to the rotor 80 at a desired pressure and a desired flow rate to power the rotor 80. In at least one embodiment, the controller 110 is configured to, based on a first operating condition of the first gas turbine engine and a second operating condition of the second gas turbine engine, such as the power level of the engines 10A, 10B control the first and second compressor bleed valves 14AV, 14BV and the first and second bypass bleed valves 22AV, 22BV.

As such, the controller 110 can control the first and second compressor bleed air and the first and second bypass bleed air to the first and second ejectors 42, 52 such that the first and second mixed bleed air are combined in the plenum 60 to form the plenum air and such that the plenum air that is output from the plenum 60 to the rotor 80 is at the desired pressure and the desired flow rate. For example, the controller 110 is configured to control the valves 14AV, 14BV, 22AV, 22BV such that the first and second compressor bleed air flows are at 3 lbm/s, respectively, and such that the first and bypass compressor bleed air flows are at 9.5 lbm/s, respectively. As such, when the bleed flows mix in the ejectors 42, 52, the ejectors 42, 52 output mixed bleeds having flow rates of 12.5 lbm/s such that the flow rate of the combined plenum air output is the required 25 lbm/s. In some embodiments, the controller 110 is always configured to ensure that the first and second compressor flow rates are lower than the first and second bypass flow rates.

The controller 110 may include at least one processor connected to a computer readable memory and/or other data storage. Computer executable instructions and data used by a processor may be stored in the computer readable memory included in an onboard computing device, a remote server, a combination of both, or implemented with any combination of read only memory modules or random-access memory modules, optionally including both volatile and nonvolatile memory.

A person skilled in the art will understand that the ejectors 42, 52, flow rates of bleed air, and pressures of bleed air as described above are only exemplary embodiments of a specific application of the system 30, in particular for a gyrocopter aircraft 100 having the requirements specified above. The types of ejectors utilized in the system 30 may be replaced or alternatively designed in order to utilize the system 30 with other applications, such as gyrocopters of different sizes, other types of aircraft, or other power generation applications. Moreover, the desired flows and pressures may be altered based on the specific application of the system 30, such as via the bleed air valves or by varying the geometry of the variable ejectors. Such modifications and alternative designs would be apparent to a person skilled in the art.

Another embodiment of a propulsion system 230 which may be utilized in the aircraft 100 in accordance with the present disclosure is shown in FIG. 5. The propulsion system 230 is substantially similar to the propulsion system 30 shown in FIGS. 1-4 and described herein. Accordingly, similar reference numbers in the 200 series indicate features that are common between the propulsion system 230 and the propulsion system 30. The description of the propulsion system 30 is incorporated by reference to apply to the propulsion system 230, except in instances when it conflicts with the specific description and the drawings of the propulsion system 230.

The propulsion system 230 is configured substantially similar to the propulsion system 30, except in that the first ejector 242 is fluidically connected to the compressor inter-stage section 14A of the first gas turbine engine 10A via a third compressor bleed air fluid line 245 in addition to being fluidically connected to the compressor discharge section 15A. Similarly, the second ejector 252 is fluidically connected to the compressor inter-stage section 14B of the second gas turbine engine 10B via a fourth compressor bleed air fluid line 255 in addition to being fluidically connected to the compressor discharge section 15B.

In the present embodiment, the operating condition may include operating the engines 10A, 10B at less than 50% power, in particular at 40% power. At values below 40% power, the maximum amount of allowable bleed air from the compressor discharge section 15A, 15B would be exceeded. As such, the bleed air taken from the compressor discharge section 15A, 15B must be supplemented with bleed air from the inter-stage section 14A, 14B. Also, at 40% power level, the total amount of core bleed (discharge and inter-stage combined) is almost at the maximum allowed by the engines 10A, 10B.

In scenarios in which the first and second operating conditions of the first and second engines 10A, 10B is at 40% power level, the first and second bypass flow rates are equal to 8.3 lbm/s and the first and second compressor flow rates are equal to 4.2 lbm/s. A portion of the first and second compressor flow rates bled from the first and second compressor discharge sections, respectively, is equal to 2.1 lbm/s, and a portion of the first and second compressor flow rates bled from the first and second inter-stage compressor sections, respectively, is equal to 2.1 lbm/s.

A method according to another aspect of the present disclosure includes a first operation of providing a first gas turbine engine including a first propulsive fan, a first engine core including a first compressor, a first combustor, and a first turbine configured to drive the first propulsive fan, and a first bypass duct surrounding the first engine core. The method includes a second operation of providing a second gas turbine engine including a second propulsive fan, a second engine core including a second compressor, a second combustor, and a second turbine configured to drive the second propulsive fan, and a second bypass duct surrounding the second engine core. The method includes a third operation of bleeding first compressor bleed air from the first compressor and first bypass bleed air from the first bypass duct to a first ejector of an air-provisioning system, and a fourth operation of bleeding second compressor bleed air from the second compressor and second bypass bleed air from the second bypass duct to a second ejector of the air-provisioning system.

In some embodiments, the method includes a fifth operation of mixing the first compressor bleed air and the first bypass bleed air in the first ejector and outputting a first mixed bleed air from the first ejector to a plenum of the air-provisioning system. The method includes a sixth operation of mixing the second compressor bleed air and the second bypass bleed air in the second ejector and outputting a second mixed bleed air from the second ejector to the plenum. The method includes a seventh operation of mixing the first mixed bleed air and the second mixed bleed air in the plenum to create plenum air having a desired pressure and a desired flow rate, and an eighth operation of outputting the plenum the plenum air to a first propulsor of the air-provisioning system at the desired flow rate and the desired pressure to drive rotation of the first propulsor.

A person skilled in the art would understand that the systems 30, 230 described above may be utilized in a variety of applications in addition to aircraft rotor power. For example, the combined bleed air flow pressures and flow rates from the bypass and compressor sources may be useful to maintain laminar flow on the wings of seaplanes. In other examples, the combined bleed air flows may be utilized for de-icing applications on aircraft. Additionally, a person skilled in the art would understand that the number and placement of engines, the number and placement of the rotors, and other such variables may be altered based on the design requirements of the particular application in which the system 30, 230 is being utilized.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion system, comprising
a first gas turbine engine including a first propulsive fan, a first engine core including a first compressor, a first combustor, and a first turbine configured to drive the first propulsive fan, and a first bypass duct surrounding the first engine core,
a second gas turbine engine including a second propulsive fan, a second engine core including a second compressor, a second combustor, and a second turbine configured to drive the second propulsive fan, and a second bypass duct surrounding the second engine core, and an air-provisioning system including a first ejector, a second ejector, a plenum that is fluidically connected with the first ejector and the second ejector, and a first propulsor, the air-provisioning system configured to bleed and mix air from the first gas turbine engine and the second gas turbine engine to provide selectively a flow of plenum air from the plenum to the first propulsor at a desired pressure and a desired flow rate to power the first propulsor, wherein the first ejector is fluidically connected to the first compressor and the first bypass duct of the first gas turbine engine such that first compressor bleed air from the first compressor and first bypass bleed air from the first bypass duct is conducted to the first ejector and the first ejector outputs a first mixed bleed air to the plenum having a pressure that is higher than a pressure of the first bypass bleed air, wherein the second ejector is fluidically connected to the second compressor and the second bypass duct of the second gas turbine engine such that second compressor bleed air from the second compressor and second bypass bleed air from the second bypass duct is conducted to the second ejector and the second ejector outputs a second mixed bleed air to the plenum having a pressure higher than a pressure of the second bypass bleed air, and wherein the first mixed bleed air and the second mixed bleed air are combined in the plenum to provide the plenum air having the desired pressure and the desired flow rate, and the plenum is configured to conduct selectively the flow of plenum air to the first propulsor at the desired flow rate and the desired pressure to drive rotation of the first propulsor.

2. The propulsion system of claim 1, further comprising a first compressor bleed valve configured to control the first compressor bleed air bled from the first compressor to the first ejector, a second compressor bleed valve configured to control the second compressor bleed air bled from the second compressor to the second ejector, a first bypass bleed valve configured to control the first bypass bleed air bled from the first bypass duct to the first ejector, and a second bypass bleed valve configured to control the second bypass bleed air bled from the second bypass duct to the second ejector, and a controller configured to, based on a first operating condition of the first gas turbine engine and a second operating condition of the second gas turbine engine, control the first and second compressor bleed valves and the first and second bypass bleed valves so as to control the first and second compressor bleed air and the first and second bypass bleed air to the first and second ejectors such that the first and second mixed bleed air are combined in the plenum to form the plenum air and such that the plenum air that is output from the plenum to the first propulsor is at the desired pressure and the desired flow rate.

3. The propulsion system of claim 2, wherein the controller is configured to control the first and second compressor bleed valves and the first and second bypass bleed valves such that a first compressor flow rate and a second compressor flow rate of the first and second compressor bleed airs, respectively, are less than a first bypass flow rate and a second bypass flow rate of the first and second bypass bleed airs, respectively.

4. The propulsion system of claim 3, wherein a first mixed bleed flow rate and a first mixed bleed pressure of the first mixed bleed air are equal to a second mixed bleed flow rate and a second mixed bleed pressure of the second mixed bleed air.

5. The propulsion system of claim 4, wherein the desired flow rate and the desired pressure of the flow of plenum air output from the plenum to the first propulsor is 25 lbm/s and 25 psia, respectively.

6. The propulsion system of claim 5, wherein the first bypass flow rate and the second bypass flow rate are in a range of 8.5 lbm/s to 12.15 lbm/s, and wherein the first compressor flow rate and the second compressor flow rate are in a range of 0.35 lbm/s to 4 lbm/s.

7. The propulsion system of claim 6, wherein a first sum of the first bypass flow rate and the first compressor flow rate is equal to 12.5 lbm/s, and wherein a second sum of the second bypass flow rate and the second compressor flow rate is equal to 12.5 lbm/s.

8. The propulsion system of claim 6, wherein the first and second operating conditions are a 50% power level of the first and second gas turbine engines, wherein the first and second bypass flow rates are equal to 9.5 lbm/s, and wherein the first and second compressor flow rates are equal to 3 lbm/s.

9. The propulsion system of claim 6, wherein the first and second operating conditions are a 100% power level of the first and second gas turbine engines, wherein the first and second bypass flow rates are equal to 12.15 lbm/s, and wherein the first and second compressor flow rates are equal to 0.35 lbm/s.

10. The propulsion system of claim 3, wherein the first compressor includes a first compressor discharge section and a first inter-stage compressor section, wherein the second compressor includes a second compressor discharge section and a second inter-stage compressor section, and wherein, in response to the first and second operating conditions being a power level of the first and second gas turbine engines being greater than 50%, the first and second compressor bleed airs are bled entirely from the first and second compressor discharge sections, respectively.

11. The propulsion system of claim 10, wherein, in response to the first and second operating conditions being a power level of the first and second gas turbine engines being equal to or less than 40%, the first and second compressor bleed airs are bled partially from the first and second compressor discharge sections, respectively, and partially from the first and second inter-stage compressor sections, respectively.

12. The propulsion system of claim 11, wherein the first and second operating conditions are a 40% power level of the first and second gas turbine engines, wherein the first and second bypass flow rates are equal to 8.3 lbm/s, wherein the first and second compressor flow rates are equal to 4.2 lbm/s, wherein a portion of the first and second compressor flow rates bled from the first and second compressor discharge sections, respectively, is equal to 2.1 lbm/s, and wherein a portion of the first and second compressor flow rates bled from the first and second inter-stage compressor sections, respectively, is equal to 2.1 lbm/s.

13. The propulsion system of claim 1, wherein the first ejector is a variable geometry ejector including at least one variable geometric feature configured to vary a flow path of at least one of the first compressor bleed air and the first bypass bleed air such that the first mixed bleed air is output at a first desired ejector output flow rate and a first desired ejector output pressure, and wherein the second ejector is a variable geometry ejector including at least one variable geometry feature configured to vary a flow path of at least one of the second compressor bleed air and the second bypass bleed air such that the second mixed bleed air is output at a second desired ejector output flow rate and a second desired ejector output pressure.

14. A propulsion system, comprising
a first gas turbine engine including a first engine core that has a first compressor and a first bypass duct surrounding the first engine core,
a second gas turbine engine including a second engine core that has a second compressor and a second bypass duct surrounding the second engine core,
a first propulsor separate from the first and second gas turbine engines, and
an air-provisioning system including a first ejector fluidly connected with the first compressor and the first bypass duct, a second ejector fluidly connected with the second compressor and the second bypass duct, and a plenum fluidically connected with an outlet of the first ejector and an outlet of the second ejector,
wherein first mixed bleed air from the first ejector and second mixed bleed air from the second ejector is combined in the plenum to provide plenum air that is selectively output from the plenum at a desired flow rate and a desired pressure, and
wherein the plenum air is output to the first propulsor to drive rotation of the first propulsor.

15. The propulsion system of claim 14, wherein first compressor bleed air from the first compressor and first bypass bleed air from the first bypass duct is conducted to the first ejector and the first ejector outputs the first mixed bleed air to the plenum having a pressure that is higher than a pressure of the first bypass bleed air, and wherein second compressor bleed air from the second compressor and second bypass bleed air from the second bypass duct is conducted to the second ejector and the second ejector outputs a second mixed bleed air to the plenum having a pressure higher than a pressure of the second bypass bleed air.

16. The propulsion system of claim 15, wherein a first mixed bleed flow rate and a first mixed bleed pressure of the first mixed bleed air are equal to a second mixed bleed flow rate and a second mixed bleed pressure of the second mixed bleed air.

17. The propulsion system of claim 16, wherein the desired flow rate and the desired pressure of the flow of plenum air output from the plenum to the first propulsor is 25 lbm/s and 25 psia, respectively.

18. The propulsion system of claim 17, wherein a first bypass flow rate and a second bypass flow rate are in a range of 8.3 lbm/s to 12.15 lbm/s, and wherein a first compressor flow rate and a second compressor flow rate are in a range of 0.35 lbm/s to 4.2 lbm/s.

19. The propulsion system of claim 18, wherein the first compressor includes a first compressor discharge section and a first inter-stage compressor section, wherein the second compressor includes a second compressor discharge section and a second inter-stage compressor section, and wherein, in response to the first and second operating conditions being a power level of the first and second gas turbine engines being greater than 40%, the first and second compressor bleed airs are bled entirely from the first and second compressor discharge sections, respectively.

20. A method comprising:
providing a first gas turbine engine including a first propulsive fan, a first engine core including a first compressor, a first combustor, and a first turbine configured to drive the first propulsive fan, and a first bypass duct surrounding the first engine core,
providing a second gas turbine engine including a second propulsive fan, a second engine core including a second compressor, a second combustor, and a second turbine configured to drive the second propulsive fan, and a second bypass duct surrounding the second engine core,
bleeding first compressor bleed air from the first compressor and first bypass bleed air from the first bypass duct to a first ejector of an air-provisioning system,
bleeding second compressor bleed air from the second compressor and second bypass bleed air from the second bypass duct to a second ejector of the air-provisioning system,
mixing the first compressor bleed air and the first bypass bleed air in the first ejector and outputting a first mixed bleed air from the first ejector to a plenum of the air-provisioning system,
mixing the second compressor bleed air and the second bypass bleed air in the second ejector and outputting a second mixed bleed air from the second ejector to the plenum,
mixing the first mixed bleed air and the second mixed bleed air in the plenum to create plenum air having a desired pressure and a desired flow rate, and
outputting the plenum air to a first propulsor of the air-provisioning system at the desired flow rate and the desired pressure to drive rotation of the first propulsor.

* * * * *